US008241733B2

(12) United States Patent
Bauer et al.

(10) Patent No.: US 8,241,733 B2
(45) Date of Patent: Aug. 14, 2012

(54) METHOD FOR PLACING INDICIA ON NONWOVEN MATERIAL AND ARTICLES THEREFROM

(75) Inventors: Walter G. Bauer, Neenah, WI (US); Kroy D. Johnson, Menasha, WI (US); Thomas D. Ehlert, Neenah, WI (US); Patrick S. McNichols, Hortonville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 13/086,435

(22) Filed: May 25, 2011

(65) Prior Publication Data

US 2011/0223378 A1 Sep. 15, 2011

Related U.S. Application Data

(62) Division of application No. 11/607,318, filed on Dec. 1, 2006, now Pat. No. 7,947,357.

(51) Int. Cl.
*B32B 3/04* (2006.01)

(52) U.S. Cl. ...................... 428/192; 438/195.1; 438/193; 2/158; 2/170

(58) Field of Classification Search ....... 428/192–195.1; 2/158–170
See application file for complete search history.

(56) References Cited

U.S. PATENT DOCUMENTS

| | | | | |
|---|---|---|---|---|
| 3,666,545 | A * | 5/1972 | Pascall et al. | 428/190 |
| 3,844,869 | A | 10/1974 | Rust, Jr. | |
| 3,849,241 | A | 11/1974 | Butin et al. | |
| 4,623,340 | A | 11/1986 | Luceri | |
| 4,663,220 | A | 5/1987 | Wisneski et al. | |
| 4,745,916 | A | 5/1988 | Seber | |
| 5,213,881 | A | 5/1993 | Timmons et al. | |
| 5,226,992 | A | 7/1993 | Morman | |
| 5,591,298 | A | 1/1997 | Goodman et al. | |
| 5,655,236 | A * | 8/1997 | Murray | 5/495 |
| D393,336 | S * | 4/1998 | Zadworny et al. | D2/619 |
| 5,897,541 | A * | 4/1999 | Uitenbroek et al. | 604/358 |
| 6,037,281 | A | 3/2000 | Mathis et al. | |
| 6,488,948 | B1 * | 12/2002 | Danieli | 424/404 |
| 6,921,570 | B2 | 7/2005 | Belau et al. | |
| 2004/0170813 | A1 | 9/2004 | Digiacomantonio et al. | |
| 2007/0026028 | A1 | 2/2007 | Close et al. | |
| 2008/0131657 | A1 | 6/2008 | Bauer et al. | |

FOREIGN PATENT DOCUMENTS

| | | | |
|---|---|---|---|
| EP | 0 140 560 | A1 | 5/1985 |
| EP | 0 217 032 | A2 | 4/1987 |
| JP | 06272102 | A * | 9/1994 |
| JP | 2002235224 | A * | 8/2002 |
| WO | WO 00/15444 | A2 | 3/2000 |
| WO | WO 01/88245 | A2 | 11/2001 |

* cited by examiner

*Primary Examiner* — Gerard Higgins
*Assistant Examiner* — Christopher Polley
(74) *Attorney, Agent, or Firm* — Denise L. Stoker; Kenya T. Pierre

(57) ABSTRACT

A method of placing a logo on an article or substrate by placing a contrast sheet behind the logo and a blocking sheet therebetween to prevent a shadow effect. The contrast sheet and blocking sheet may be hidden within the hem of an article.

7 Claims, 7 Drawing Sheets

METHOD FOR PLACING INDICIA ON NONWOVEN MATERIAL AND ARTICLES THEREFROM

This application is a divisional of application Ser. No. 11/607,318 entitled Method For Placing Indicia on Nonwoven Material And Articles Therefrom and filed in the U.S. Patent and Trademark Office on Dec. 1, 2006, now U.S. Pat. No. 7,947,357.

BACKGROUND

Fabrics made from nonwoven materials may be used to construct a variety of articles, ranging from clothing, linens, medical supplies, and packaging. In short, such fabrics can be used to construct any item that can be made from conventional woven fabrics.

Articles made from nonwoven fabric may benefit or even be required to have indicia somewhere on the article for source identification, aesthetic purposes, or to relay information about the nature or intended use of the article. Articles often have tag-style labels sewn into a seam or onto a surface. However, tags may be cumbersome to apply in high-speed manufacturing, may be irritating to a wearer's skin if applied to clothing, and may not be aesthetically pleasing.

Printed labeling has been used on articles such as clothing, to address some of the problems tag-style labels present. However, printing is not always viable if the fabric is significantly textured or if the article is used with any solvent that could cause the ink to bleed or transfer to other surfaces.

There remains a need for an improved method for applying indicia such as a label to nonwoven fabrics and articles made therefrom.

SUMMARY

In response to the discussed deficiencies associated with prior absorbent garments, a nonwoven article includes a substrate having a first surface and an opposite-facing second surface with an indicia visible from the substrate first surface and defining an indicia area. A contrast sheet covers at least a portion of the indicia area at the substrate second surface. A first blocking sheet, located between the contrast sheet and the substrate, covers at least a portion of the indicia area at the substrate second surface.

In another aspect of the present invention, a nonwoven article includes a substrate having a first surface and an opposite-facing second surface, the first surface and the second surface defining a substrate area with an edge. The substrate is folded adjacent the edge to form a fold line and a hem. An indicia is located at the hem between the edge and the fold line, wherein the indicia is visible at the substrate first surface. A contrast sheet covers the indicia at the substrate second surface. The contrast sheet defines a contrast area that is smaller than the substrate area.

In a further aspect, the present invention is a method for making an indicia on a nonwoven substrate having a first surface and an opposite-facing second surface. The steps of the method include: defining an indicia area on the substrate at a predetermined location; disposing a first blocking sheet on the substrate second surface so that it coincides with the indicia area; forming an indicia group by disposing a contrast sheet to cover at least a portion of the indicia area onto the first blocking sheet such that the first blocking sheet is between the contrast sheet and the indicia area; and melting together the substrate with the indicia group between a hammer device and an anvil.

In yet another aspect, the invention is a method for making an indicia on a nonwoven article constructed from a nonwoven substrate having a first surface and an opposite-facing second surface. The method includes the following steps: defining an indicia area on the article at a predetermined location; disposing a first blocking sheet on the substrate second surface so that it coincides with the indicia area; forming an indicia group by disposing a contrast sheet onto the first blocking sheet such that the first blocking sheet is between the contrast sheet and the indicia area; and melting together the substrate with the indicia group between a hammer device and an anvil bearing an indicia pattern.

BRIEF DESCRIPTION OF THE DRAWINGS

The present invention is illustrated by way of example in the following drawings in which like characters indicate similar elements throughout the several views. The following drawings disclose various embodiments of the present invention for purposes of illustration only, and are not intended to limit the scope of the invention.

DETAILED DESCRIPTION OF THE INVENTION

Figure 1:
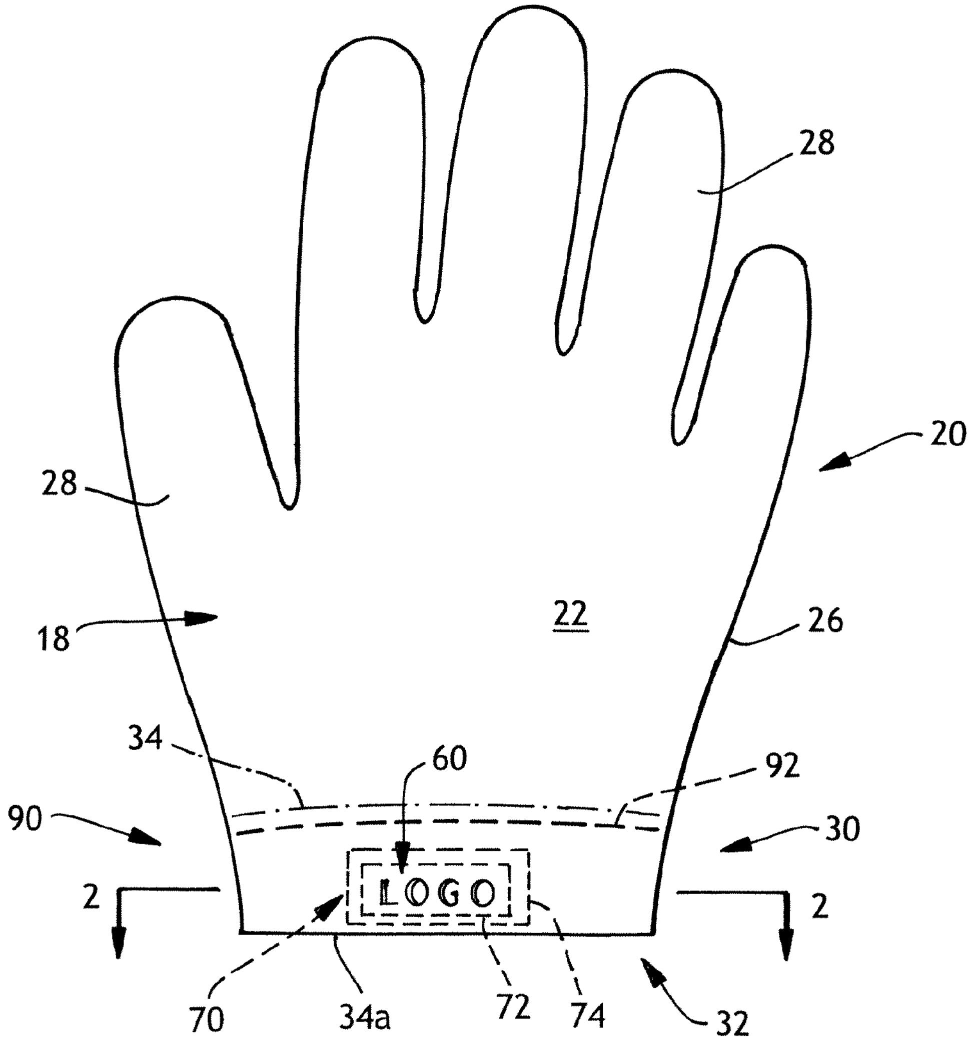
FIG. 1 is a plan view of an article having an indicia made in accordance with one embodiment of the method of the present invention.

The present invention relates to a method of placing indicia on a nonwoven fabric such as SFS (spunbond-film-spunbond), SMS (spunbond-meltblown-spunbond), CFSBL (continuous filament stretch bonded laminate) and the like, including articles made in accordance with the method. The method may be used on fabric substrates of various textures, or may be applied to an article made from such fabrics.

Generally, the indicia may have a different color and/or value than the substrate on which it is placed. This difference in color and/or value is due to a layer of material that is disposed on the substrate at the opposite side from which the indicia is meant to be viewed. The layer of material is referred as a contrast sheet. If the contrast sheet can be seen through the substrate in areas other than that defining the indicia, it may be desirable to place an intermediate layer or blocking sheet therebetween. The indicia is formed by bonding the layers to the substrate using an anvil bearing the indicia and a device that creates heat, as described herein. Contrast and blocking sheets located behind the indicia may be hidden in the finished article by enclosing the sheets within a hem.

For purposes of illustration only, the present invention will be described for use with an article of clothing made from SFS material having a highly textured surface. One particular example is a disposable glove shown in FIG. 1. However, the invention should not be limited for use on specific articles (e.g. clothing, highly-textured fabrics, SFS), unless recited in the claims, as it is instead intended that the present invention be used in all applications in which an indicia is disposed on an article or web of nonwoven fabric.

"Disposable" refers to articles which are designed to be discarded after a limited use rather than being laundered or otherwise restored for reuse.

The terms "disposed on," "disposed with," and variations thereof are intended to mean one element can be a separate structure bonded to or placed with or placed near another element.

"Layer" when used in the singular can have the dual meaning of a single element or a plurality of elements.

"Meltblown" refers to fibers formed by extruding a molten thermoplastic material through a plurality of fine, usually circular, die capillaries as molten threads or filaments into converging high-velocity gas (e.g., air) streams, generally heated, which attenuate the filaments of molten thermoplastic material to reduce their diameters. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al. Meltblowing processes can be used to make fibers of various dimensions, including macrofibers (with average diameters from about 40 to about 100 microns), textile-type fibers (with average diameters between about 10 and 40 microns), and microfibers (with average diameters less than about 10 microns). Meltblowing processes are particularly suited to making microfibers, including ultra-fine microfibers (with an average diameter of about 3 microns or less). A description of an exemplary process of making ultra-fine microfibers may be found in, for example, U.S. Pat. No. 5,213,881 to Timmons, et al. Meltblown fibers may be continuous or discontinuous, and are generally self bonding when deposited onto a collecting surface.

"Nonwoven" and "nonwoven web" refer to materials and webs of material that are formed without the aid of a textile weaving or knitting process. For example, nonwoven materials, fabrics, or webs have been formed from many processes such as, for example, meltblowing processes, spunbonding processes, air laying processes, and bonded carded web processes.

"Indicia" refers to a word, phrase, numerals, aesthetic design, or a combination thereof, which may be used to relay information and/or for aesthetic reasons. For example, a logo bearing a trademark may be an indicia in accordance with this definition.

The above-noted terms may be defined with additional language in the remaining portions of the specification.

The variety of disposable articles made from nonwoven fabrics includes sheet-like items and articles that are constructed from layers or multiple parts. Sheet-like items include, but are not limited to, towels, sheets, blankets, bath mats, and cloths for cleaning the body or household surfaces. Articles constructed from single or multiple separate layers of material include but are not limited to pillow cases, bags, garments, toys, and the like. Thus, disposable articles made from nonwovens can be useful in many industries and settings.

As an example, disposable garments may be desirable for use in spa or medical environments. Such items are readily disposable because the nonwoven fabric from which they are made is generally less expensive than durable fabrics such as woven polyesters, cotton, wool, and the like. Further, it is often easier to construct articles from nonwoven fabrics because they do not need to be durable to withstand laundering. Nonwoven garments can be constructed using ultrasonic, pressure bonding, or other thermal bonding techniques. Spa and medical-related garments, in particular, include robes, socks, slacks, shorts, bras, shirts, skirts, headbands, gowns, and medical caps.

Nonwoven materials are made from thermoplastic polymeric materials, which make them suitable for the method of the present invention. Specifically, commercially available thermoplastic polymeric materials can be employed in making the fibers or filaments from which the nonwoven fabric is formed. As used herein, the terms "thermoplastic polymer" or "thermoplastic polymeric material" refer to a long-chain polymer that softens when exposed to heat and returns to the solid state when cooled to ambient temperature. Exemplary thermoplastic materials include, without limitation, polyvinyl chlorides, polyesters, polyamides, polyfluorocarbons, polyolefins, polyurethanes, polystyrenes, polyvinyl alcohols, caprolactams, and copolymers of the foregoing. As used herein, the term "polymer" shall include, but is not limited to, homopolymer, copolymers, such as, for example, block, graft, random and alternating copolymers, terpolymers, etc., and blends and modifications thereof. Moreover, unless otherwise specifically limited, the term "polymer" shall include all possible geometric configurations of the material, including, without limitation, isotactic, syndiotactic, random and atactic symmetries.

Nonwoven webs that can be used to manufacture articles of the present invention can be formed by a variety of known forming processes, including spunbonding, airlaying, meltblowing, or bonded carded web formation processes. Spunbond nonwoven webs are made from melt-spun filaments. As used herein, the term "meltspun filaments" refers to small diameter fibers and/or filaments which are formed by extruding a molten thermoplastic material as filaments from a plurality of fine, usually circular, capillaries of a spinneret with the diameter of the extruded filaments then being rapidly reduced, for example, by non-eductive or eductive fluid drawing or other well known spunbonding mechanisms. Lastly, the melt-spun filaments are deposited in a substantially random manner onto a moving carrier belt or the like to form a web of substantially continuous and randomly arranged, melt-spun filaments. Spunbond filaments generally are not tacky when they are deposited onto the collecting surface. It may be desirable to produce articles using textured nonwoven fabrics as they look and feel more cloth-like. For additional examples of fabrics that may be used in conjunction with method of the present invention, see, e.g., U.S. Pat. No. 6,037,281, entitled "Cloth-Like, Liquid-Impervious, Breathable Composite Barrier Fabric," to Mathis, et al.; U.S. Pat. No. 4,663,220 issued May 5, 1987 to Wisneski et al.; U.S. Pat. No. 5,226,992 issued Jul. 13, 1993 to Morman; European Patent Application No. EP 0 217 032 published on Apr. 8, 1987 in the name of Taylor et al.; and PCT application WO 01/88245 in the name of Welch et al.; all of which are incorporated herein by reference in a manner consistent herewith.

One or more substrates, such as those described above, may be configured into one of the articles described above. Often, such an article will be made by cutting a substrate into appropriate pieces such that the pieces, when attached to one another, the pieces form an article having an interior volume into which something may be inserted, such as a portion of a body. Other embodiments will be articles that are largely in sheet form. Most suitably, raw edges on articles used in conjunction with the method of the present invention will be hemmed as described herein.

Figure 1A:
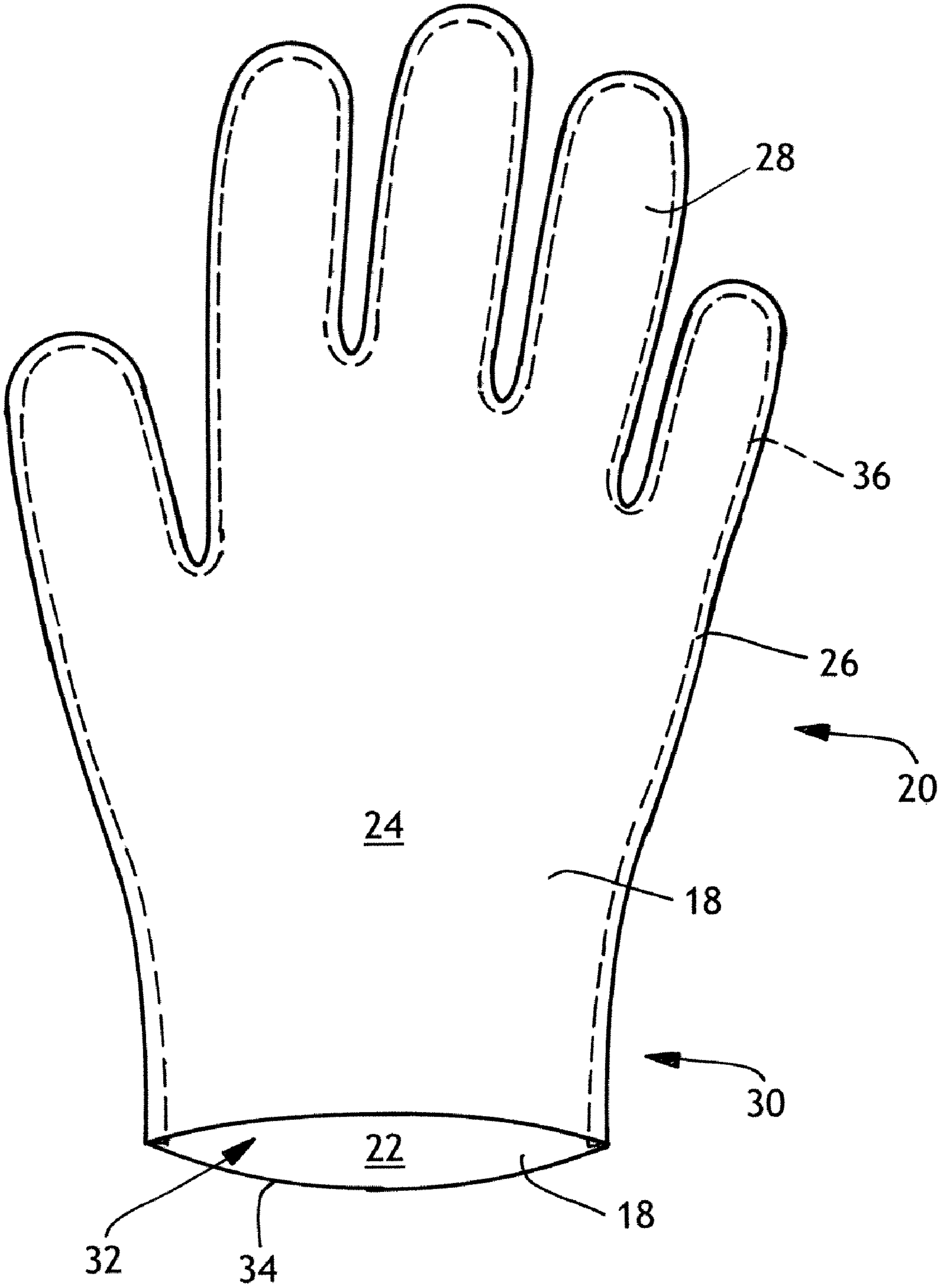
FIG. 1A is a front perspective view of the article of FIG. 1, shown inverted and having an unfinished opening.

An exemplary article used in conjunction with one embodiment of the present invention is the disposable glove 20 as seen in FIGS. 1 and 1A. The glove 20 is constructed from a pair of hand-shaped blanks 18 cut from a substrate having an outer, first-surface 22 and an opposite-facing, second-surface 24. (For further detail regarding the glove construction, see U.S. patent application Ser. No. 11/190,597, incorporated by reference to the extent that it is consistent with this application.) The blanks 18 are aligned and joined together around an outer perimeter 26 which defines the finger and thumb portions 28 of the glove 20. An end region 30 is left unjoined to form an opening 32 in which a wearer may insert a hand. An edge 34 defines this opening.

In this representative illustration, the two blanks 18 may be attached to one another mechanically by sewing the pieces together at a location proximate to the perimeter 26 of the two substrates. However, the individual substrates or pieces need not be sewn together. The individual pieces or substrates may also be joined ultrasonically, thermally, adhesively, cohesively, using tape, by fusing the materials together (e.g., by using an appropriate solvent), by welding the materials together, or by other approaches. So long as the individual pieces or substrates remain attached or connected during normal use of the article, and attachment or connection is such that the composition or formulation on the interior surface of the article is contained within the article (i.e., there is minimal or no leakage of the formulation or composition), any connection or attachment may be used.

A completed glove 20 may be later inverted as described herein so that the seam 36 formed by sewing the substrates together is on the interior of the finished article. Of course the finished article need not be inverted; the seam can remain on the exterior of the article.

Note, too, that the individual pieces need not be joined in a way that produces a seam. The edges of the individual pieces may be butted together, and then, for example, joined and/or welded together using a solvent. Alternatively, the individual pieces may be butted together, and another material, such as an adhesive or an adhesive tape, used to join the pieces together.

Figure 5:
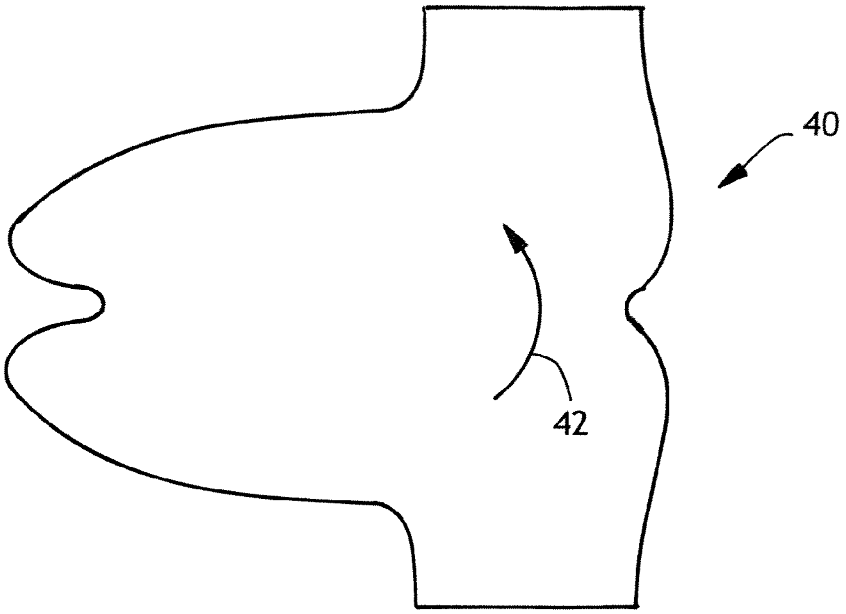
FIG. 5 is a plan view of another article used in accordance with an embodiment of the present invention, the article in an unformed state.
Figure 6:
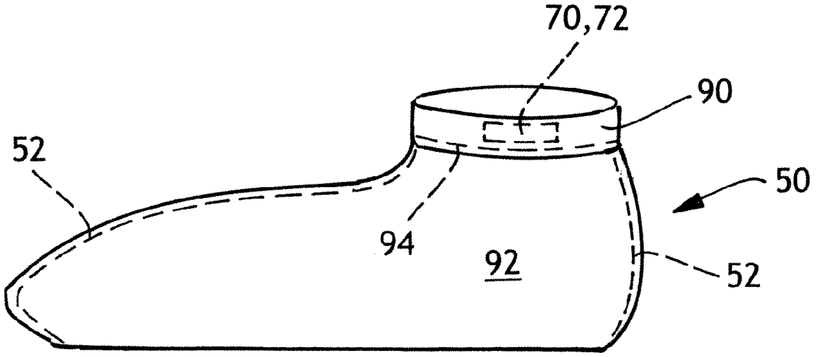
FIG. 6 is a front perspective view of the article shown in FIG. 5, the article in a finished, inverted state.

It is further contemplated that some articles may be formed from a single piece of substrate. FIG. 5 representatively illustrates a substrate 40 that has been cut in a way that a foot-shaped article may be formed by folding the substrate back on itself (as shown by arrow 42; the bottom half of the shape is folded upward, and on top of, the top half of the shape). FIG. 6 representatively illustrates such a foot-shape article 50 and the resulting seams 52 formed when the substrate 40 (from FIG. 5) is folded back, and attached to, itself. In this representative embodiment, the foot-shape article was inverted after the substrate was attached to itself so that the seams were on the inside of the article. As with two (or more) pieces that may be joined together to form an article of the present invention, a single piece may be joined to itself using any of the approaches discussed above.

An indicia 60 may be placed on any predetermined area of the substrate forming an article, such as the articles depicted in FIGS. 1 and 6. Referring now to FIG. 1, the indicia 60 is shown as an exemplary word, in particular, "LOGO." Most suitably, the indicia 60 differs from the blank 18 substrate by hue, color saturation, or value. For example, blank 18 may be relatively light-colored (high value), and the indicia 60 be relatively dark-colored (low value). In addition to, or in the alternative, the blank 18 hue may be complementary or contrasting to the hue of indicia 60. For example, possible color and value combinations include but are not limited the following: a substrate in low-saturated pastel colors such as white, light yellow, light pink, light blue, light green, light purple; and the indicia 60 in highly-saturated colors of red, blue, green, brown, black, purple, brown, and orange. It is further contemplated that the indicia 60 be the same hue and value as the substrate. Almost limitless combinations of colors of various hues, color saturation, and value may be used, and the invention is not to be limited to this miniscule sampling of colors. For instance, even a very dark substrate may be combined with light or neon-colored indicia. Further, the indicia 60 may have multiple colors, e.g. a rainbow effect. It is also contemplated that the indicia 60 have two or more colors or values, one of which colors may be the same as the substrate. For example, the word "LOGO" might have a blue "L" and a substrate-colored "OGO."

Figure 2:
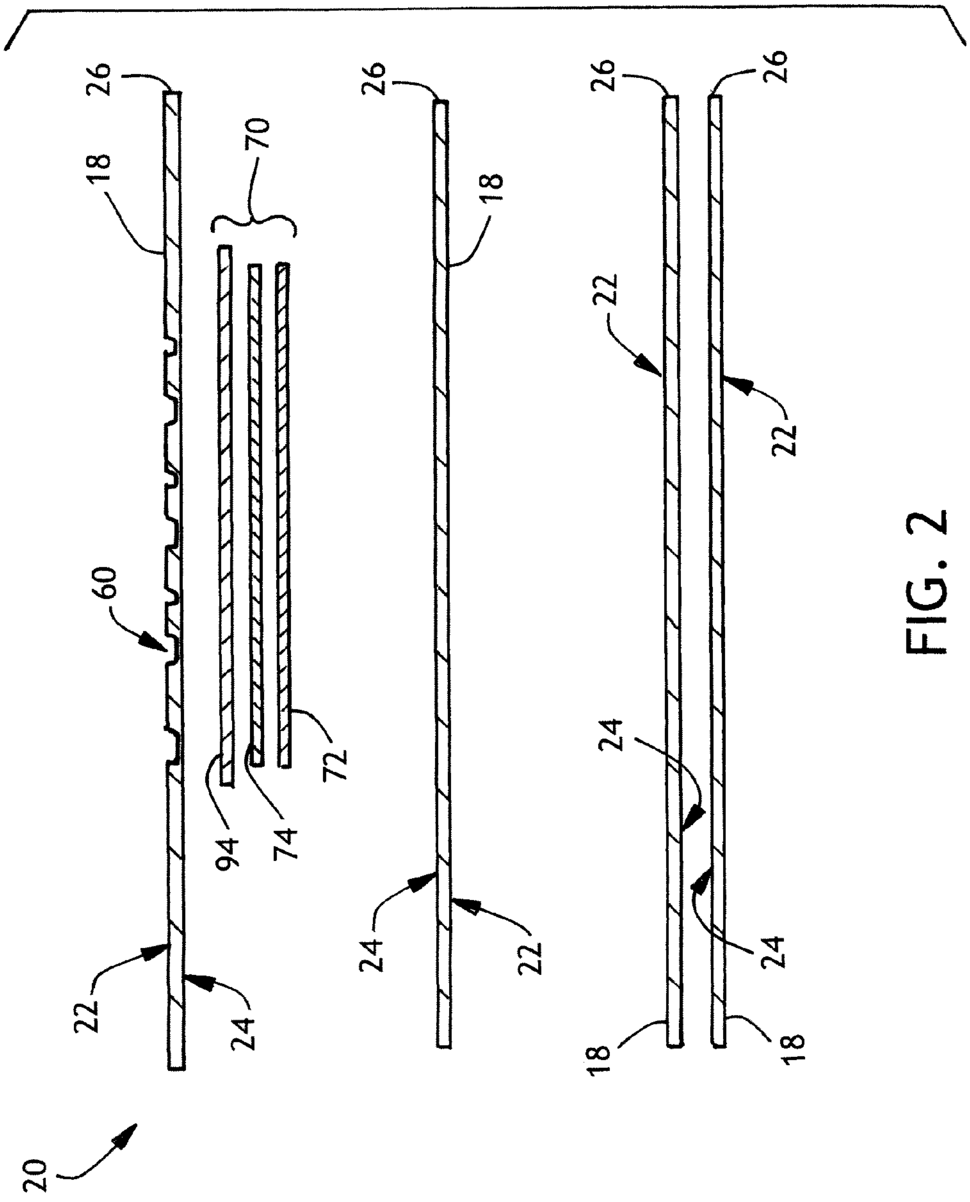
FIG. 2 is an exploded view taken in the plane of line 2-2 of FIG. 1.

Referring now to FIGS. 1 and 2, the indicia 60 has two components: the blank 18 substrate and an indicia group 70. The indicia group 70 may be comprised of one or more layers of nonwoven material capable of forming a laminated structure with the substrate when subjected to bonding as described herein. Indicia group 70 includes at least one contrast sheet 72. Optionally, the indicia group 70 includes one or more blocking sheets 74.

Figure 1B:
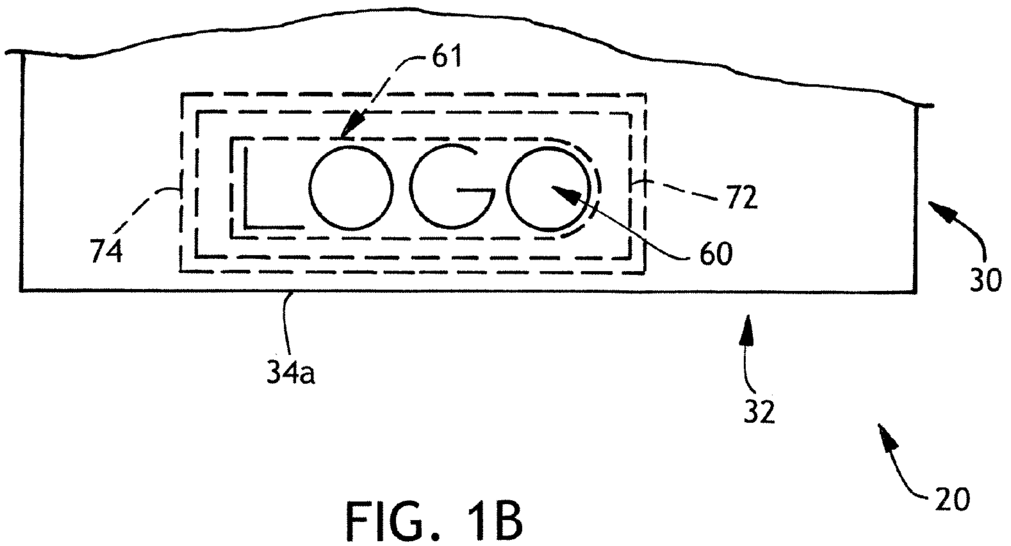
FIG. 1B is a partial enlargement of the article shown in FIG. 1.

Contrast sheet 72, as described above, suitably may differ from the substrate in hue, color saturation, and value. The primary purpose of contrast sheet 72 is to make the indicia 60 visually stand out from the substrate. A secondary purpose is to add strength to the indicia 60 to avoid tearing as indicia 60 may form stress concentrations in the substrate. Contrast sheet 72 is a sheet member that may have an area that is larger than the area defined by the indicia 60. For example, the continuous area or indicia area 61 is the area within which the word LOGO fits exactly is the area defined by indicia 60 (see FIG. 1B). It is further contemplated that the contrast sheet 72 may be separated into two or more parts that cover separate portions within the indicia area 61. For example, the word "LOGO" might have a blue contrast sheet behind the "L" and either no contrast sheet or a different color contrast sheet behind the "OGO." If there is no contrast sheet behind the "OGO" portion if the indicia 60, then the "OGO" portion will be the color of the substrate.

Blocking sheets 74 serve a different purpose than contrast sheet 72. Blocking sheets 74 are used to hide the extraneous portions of the contrast sheet 72 which do not define the indicia 60. For instance, if the blank 18 is formed from a relatively thin, white SFS substrate, and the contrast sheet 72 is formed from a dark blue rectangle-shape as in FIG. 1, without the blocking sheet 74, the indicia 60 is quite visible after the bonding force has been applied to the article as described below, but so might a blue shadow defining the entire contrast sheet 72. To avoid the blue shadow, blocking sheet(s) 74 may be placed between the contrast member 72 and the blank 18 substrate.

Blocking sheets 74 may suitably be light in color, and have the characteristic of becoming relatively translucent when bonded to the blank 18 substrate and contrast sheet 72. See commonly owned U.S. Pat. No. 5,897,541, issued on Apr. 27, 1999, to Uitenbroek, et al., incorporated herein to the extent it is consistent with the present invention. For instance, a blocking sheet 74 may be white SMS, white spunbond, polypropylene film, polyethylene, or any material that can be melt-bonded to the blank 18 substrate. In the alternative, blocking sheet may have the same hue as the blank 18 substrate, with the same or lighter value. It is noted that blocking sheet(s) 74 will lower the color saturation of the indicia group 70 as compared to an indicia group 70 created without one or more blocking sheets 74. The lowering of color saturation may be a function of basis weight of each blocking sheet, the number of blocking sheets 74 used, and any fillers, brighteners or dyes incorporated into each blocking sheet 74.

Note that FIG. 2 is an exploded view of the glove 20 taken at the place 2-2 of FIG. 1. Though not shown, the sheets of the indicia group 70 would be deformed after being subjected to the bonding force. For reasons of simplicity, the sheets of indicia group 70 are shown as smooth, flat sheets. In addition, the edge at perimeter 26 is shown flat, as if a stitched seam where not used. Again, glove 20 has been depicted this way to simplify the illustration, and such simplicity should not be used to limit the scope of the invention.

One or more layers of the indicia group 70 may be scented so that the article is perfumed. This may be useful for garments, e.g. glove 20, worn on the body for beauty treatments. This is especially useful if all other parts of the article are unscented for sensitive users.

In one embodiment of the present invention, it is desirable that the article used with the method of the present invention have the indicia group 70 located adjacent a hemmed edge so that it may be hidden underneath the hem. For example, the article shown in FIG. 6 is a bootie article 50 that has a hem 90. Hem 90 is folded over to the body-facing surface 92 of the garment to cover at least the contrast sheet 72, and most suitably, the entire indicia group 70. Suitably, hem 90 is secured by stitching 94 or any other fastening methods that could be used to create seam 52. One advantage the hem 90 may provide is a cleaner, more finished look. In addition, hem 90 may prevent dye transfer occurring as lotions, perspiration, or other liquids make contact with the contrast sheet 72.

Figure 3:
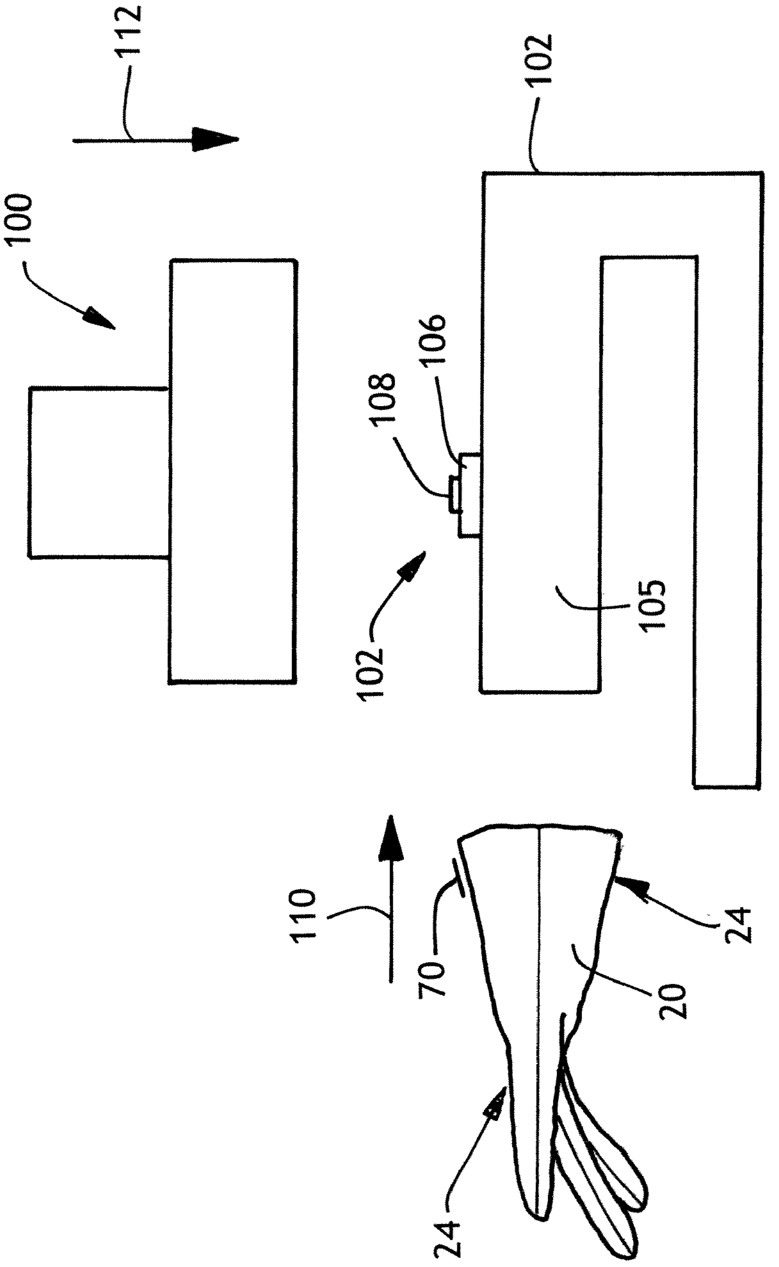
FIG. 3 is a perspective view of a process step used to make the article of FIG. 1.

The method according to the present invention is discussed in the context of the article shown in FIGS. 1-3, and includes the basic steps of: determining an area on a substrate for placement of indicia 60; placing at least part of an indicia group 70 on the second surface 24 of the blank 18 to cover the indicia 60; and bonding the all indicia group 70 layers to the blank 18 substrate using a thermal bonding technique, as is known in the art. It is further contemplated that blank 18 is merely a substrate, and that these steps may instead be carried out on a nonwoven web or sheet prior to being made into an article. The example article as described herein is not intended to limit the method to this particular article of clothing, or even to clothing in general.

As described, in one embodiment of the present invention, the method for creating an indicia 60 on a substrate of a web, sheet, or article includes the step of defining an indicia area 61 on the glove 20 at a predetermined location. While the indicia 60 may be placed anywhere on an article, there may be practical limitations with respect to ease of manufacture. While practical limitations are acknowledged, they are not intended to limit the scope of the invention. For instance, it may be far easier to place indicia 60 near the opening 32 of glove 20 than it would be to place indicia 60 at the tip of a finger 28. Regardless, it is contemplated that the bonding techniques mentioned herein may be adapted to be used anywhere on an article.

One possible predetermined location at which indicia 60 may be placed, such as on glove 20, is near a hem 90. In the particular example shown in FIGS. 1 and 1A, hem 90 is formed when the edge 34 is pulled toward the fingers 28 of the glove, so that the substrate is overlapped. Suitably, for any article worn on the body, a hem 90 may folded in toward the body-facing surface which in this example, causes the second surface 24 to contact itself. The hem 90 may be secured as described herein. As seen in FIG. 1, the indicia is located between the folded edge **34*a* and the edge 34. However, it is further contemplated that the indicia 60 may be placed on the hem itself, and that the hem 90 may be folded out toward the garment-facing surface, or surface 22** (not shown).

So that indicia 60 may be a color or value that is different than the substrate, at least one contrast sheet 72 is disposed on the second surface 24 behind the indicia area 61. Most suitably, the contrast sheet 72 is an SMS sheet having a basis weight of about 30 gsm to about 100 gsm. Contrast sheet 72 may have higher or lower basis weights, and may be spunbond, polypropylene film, polyethylene, or any material that can be melt-bonded to the blank 18 substrate. The contrast sheet 72 defines the indicia group 70, either in whole or in part, depending on whether or not a blocking sheet 74 is used. When more than one contrast sheet 72 is used, they may be placed adjacent one another in a non-overlapping manner.

When it is desirable to use the optional blocking sheet(s) 74 as described herein, it is placed between the substrate, such as blank 18, and the contrast sheet 72. It may be suitable that the blocking sheet 74 has an area larger than the contrast sheet 72 area. Further, it may be suitable that contrast sheet 72 coincide with or be aligned with blocking sheet(s) 74 such that when the indicia is viewed from surface 22, no outline or shadow of contrast sheet 72 is visible, except for the portion which defines the actual indicia 60. It is further contemplated that a blocking sheet 74 may have an area that is smaller than a corresponding contrast sheet, or may be such that it covers only one of several contrast sheets 72.

Most suitably, each blocking sheet 74 is an SMS sheet having a basis weight of about 15 gsm to about 100 gsm. If more than one blocking sheet 74 is used, they do not have to be identical in basis weight, color, or value. It may be desirable to use a combination of lower basis weight materials because of material cost or availability. It may further be desirable to stagger the sizes of each blocking sheet 74 so that the indicia group 70 does not feel like a distinct form when felt from surface 22.

Referring to FIG. 3, the indicia group 70 is bonded to the blank 18 or substrate using any bonding technique that melts the material layers together to form the bond. For instance, the bond may be formed using a "hammer device" 100 such as a plunge or press ultrasonic horn and anvil 102. Other processes are contemplated such as a rotary ultrasonic horn and anvil, or any other process capable of creating the bond pattern using pressure, thermal energy, ultrasonic energy, adhesive, or the like. It is the bonding process that actually creates the indicia 60.

In very general terms, in one embodiment, anvil 102 may be constructed from a bearing block 104 on which there is a stamp member 106. For example, as is known in the art, stamp member 106 may be a chemically etched magnesium block, whereby the etching process has left behind a design 108 that protrudes from a stamp member surface 106. Of course, any other method of creating a design transferable from the stamp member 106 by the bonding methods described, could be used.

The article, in this case glove 20, is placed against the stamp member 106 such that the indicia group 70, and in particular, the contrast sheet 72, completely covers the indicia design 108. In the specific example of FIG. 3, the bearing block includes an arm 105 that supports the stamp member 106. The glove is moved in direction 110 such than the contrast sheet 72 of indicia group 70 is positioned over the design 108. The hammer device applies energy to the design 108 such that the indicia group 70 is bonded to the substrate of glove 20. This may include the step of applying energy or force in direction 112 against the anvil 104.

In one embodiment, it may be desirable to perform the bonding step such that second surface 24 and indicia group 70 faces the hammer device 100, and the first surface 22 faces the stamp member 106. In effect, when the second surface 24 of the article 20 is facing outward, the article is inside-out, and a mirror-image of logo 60 is on stamp member 106. When the bonding step is performed with this orientation, the appearance of the indicia 60 is non-glossy and appears to be more puffy or three-dimensional, see FIG. 4B. The three-dimensionality is produced when the non-bonded areas 23 protrude outwardly from the bonded indicia 60 surface.

However, it may be desirable to perform the bonding step such that first surface 22 faces the hammer device 100, and the second surface 24 and indicia group 70 faces the stamp member 106. In this orientation, the logo 60 is not a mirror-image, but would instead appear as intended on the final product. Further, in this orientation, the indicia area 61 and optionally, a perimeter surrounding indicia area 61, may acquire an overall glossy appearance.

Figure 3A:
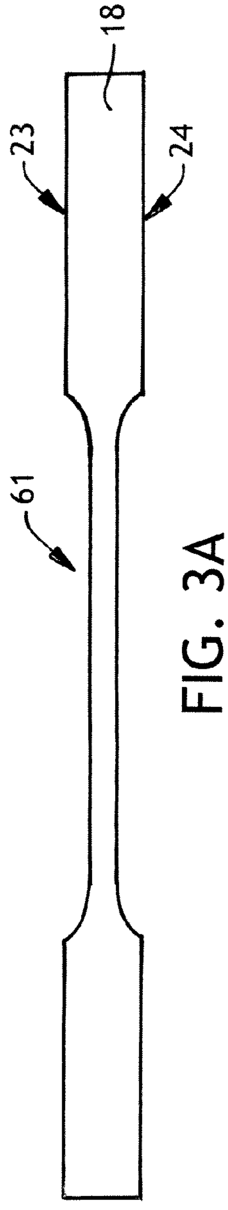
FIG. 3A is a cross section of a substrate used in an embodiment of the present invention, showing a portion that has been pre-ironed.

In another embodiment of the method of the present invention, the indicia area 61 is "pre-ironed" prior to the bonding step. The purpose of this optional step is to prepare the indicia area 61 by flattening the substrate so that indicia 60 will not become hidden within the substrate texture. Thus, this step is most suitable for highly textured nonwoven substrates. Most desirably, the "pre-ironing" step is achieved by using a similar arrangement as shown in FIG. 3. However, instead of using a stamp member 106 with a raised design surface 108, the design surface 108 is smooth and flat. The heat energy imparted into the nonwoven substrate from the "hammer device" 100 pressing the substrate against the smooth, flat stamp member 106 in effect "irons" both surfaces of the substrate as depicted in FIG. 3A3A.

Figure 4A:
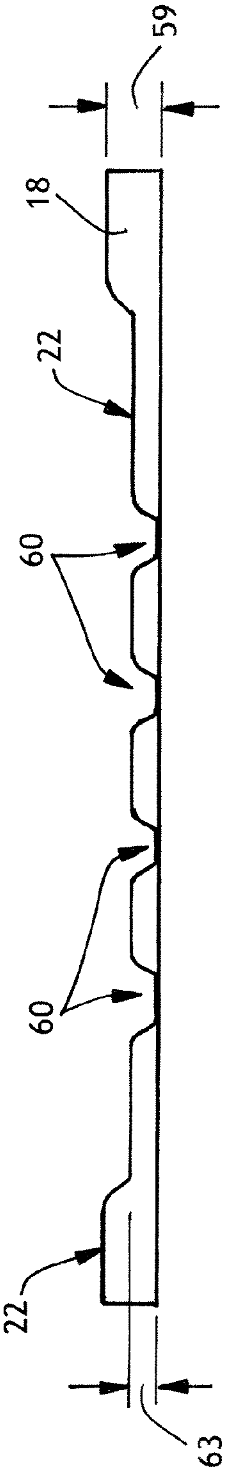
FIG. 4A is a cross section of an indicia made in accordance with one embodiment of the present invention.
Figure 4B:
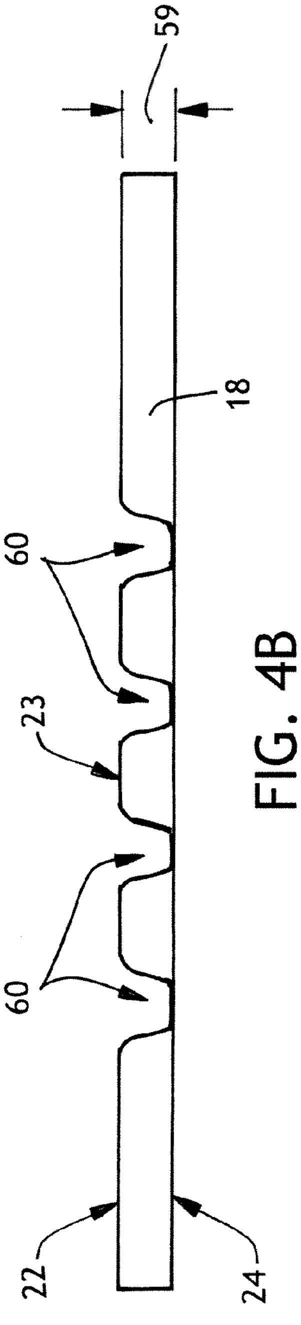
FIG. 4B is a cross section of an indicia made in accordance with another embodiment of the present invention.

As shown in FIG. 4A, the substrate of blank 18 is reduced from a thickness 59 to a thickness 63 by pre-ironing the indicia area 61 and optionally, an additional area surrounding the indicia 60. As compared to the indicia 60 of FIG. 4B, one effect of this flattening is that indicia 60 is easier to see when viewed from surface 22. This flattening effect may also be achieved by applying the stamp 106 to the substrate surface from which the indicia 60 is meant to be viewed.

As mentioned previously, another optional step is to create a hem 90 to cover the indicia group 70. In the context of the example shown in FIGS. 1-3, the hem 90 is created as described above, and secured with stitching 92 or by use of adhesive, ultrasonic methods, thermal methods, or the like. If necessary, the article such as glove 20 is turned right-side out so that the first surface 22 and indicia 60 are visible.

The indicia group 70, as described above, may be cut and placed on a substrate or blank 18 in a high-speed manufacturing setting. This provides an advantage of being able to provide quality, lower cost indicia to a substrate which can appear almost like an embroidered logo, depending on the texture of the substrate and the colors used for substrate and indicia group 70.

It will be appreciated that details of the foregoing embodiments, given for purposes of illustration, are not to be construed as limiting the scope of this invention. Although only a few exemplary embodiments of this invention have been described in detail, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

The invention claimed is:

1. A nonwoven article comprising:

a substrate having a first surface and an opposite-facing second surface, the first surface and the second surface defining a substrate area with an edge, wherein the substrate is folded adjacent the edge to form a fold line and a hem;

an indicia located at the hem between the edge and the fold line, wherein the indicia is visible at the substrate first surface; and a contrast sheet covering the indicia at the substrate second surface, wherein the contrast sheet defines a contrast area that is smaller than the substrate area; and a color-blocking sheet located between the substrate and the contrast sheet; wherein the color blocking sheet and the substrate and the contrast sheet are laminated at the indicia.

2. The nonwoven article of claim 1 wherein the contrast sheet has a different value than the substrate.

3. The nonwoven article of claim 1 wherein the color-blocking sheet has a value equal to the substrate.

4. The nonwoven article of claim 1 wherein the nonwoven article is a disposable glove.

5. The nonwoven article of claim 1 wherein the nonwoven article is a disposable sock.

6. The nonwoven article of claim 1 wherein the color-blocking sheet or the contrast sheet is scented.

7. The nonwoven article of claim 1 wherein the color-blocking sheet has a larger area than the contrast area.

* * * * *